B. O. DAHL.
HOE.
APPLICATION FILED JULY 13, 1914.
1,122,484.  Patented Dec. 29, 1914.
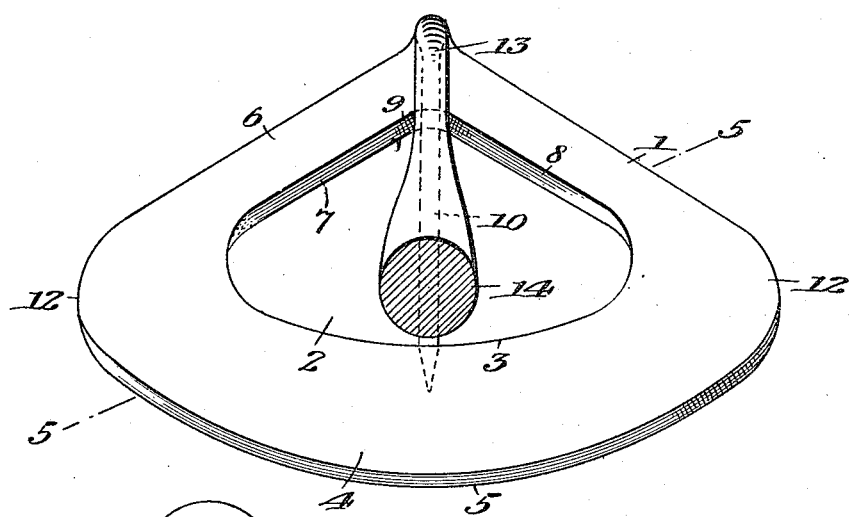
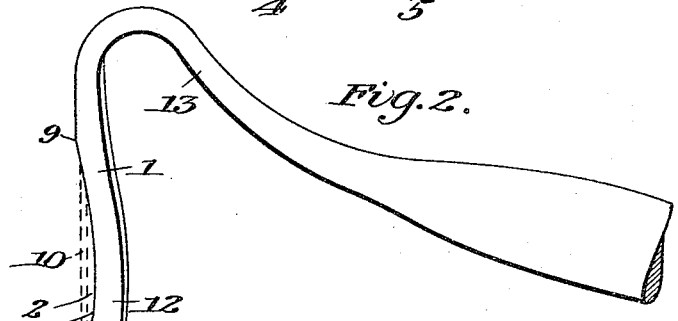
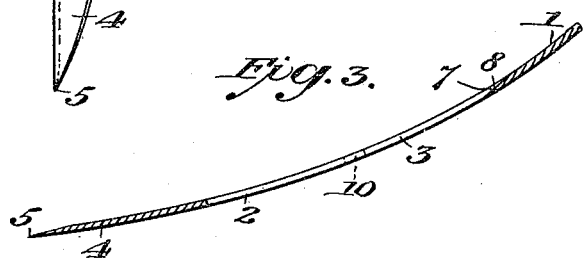
Witnesses:
Henry Bennett
John M. Dawson
Inventor:
Berent O. Dahl

UNITED STATES PATENT OFFICE.

BERENT O. DAHL, OF VIROQUA, WISCONSIN.

HOE.

1,122,484.

Specification of Letters Patent.

Patented Dec. 29, 1914.

Application filed July 13, 1914. Serial No. 850,800.

*To all whom it may concern:*

Be it known that I, BERENT O. DAHL, a citizen of the United States, residing at Viroqua, in the county of Vernon, State of Wisconsin, have invented certain new and useful Improvements in Hoes, of which the following is a specification.

The present invention relates to hoes, and it has for its object to provide a hoe which shall be so constructed as to be much more convenient and effective in use than the hoes constructed in ordinary manner enabling the work to be done much faster and better.

With this and other objects in view which will appear as the nature of the invention is better understood the same consists essentially in a hoe blade having its body portion centrally cut away and a slightly rounded portion provided with an effective cutting edge, the corners at each side of said edge being rounded. The opposite blade portion being also provided with relative angularly disposed straight edges and an intermediate arch shaped edge and being particularly adapted for a light weight hoe to remain free from clogging of earth, and to easily penetrate the ground, which will facilitate the operation and increase the efficiency of the hoe.

Another object of the invention is to have the side portions or corners of the blade rounded and adapted for removing weeds grown close to plants, without the danger as with hoes having sharp corners cutting or of injuring the plant.

With these objects in view the invention consists in the improved construction and arrangements of parts which will be hereafter fully described and particularly pointed out in the claims.

In the accompanying drawings there has been shown a simple and preferred form of the invention, it being however understood, that no limitations is necessarily made to the precise structural details therein exhibited, but that further changes, alterations, and modifications within the scope of the invention may be resorted to when desired.

In the drawings Figure 1 is a rear elevation view of the hoe. Fig. 2 is a perspective side elevation view thereof showing the blade in combination with the shank. Fig. 3 is a transverse sectional view of the hoe blade taken on the line 5—5 of Fig. 1.

Referring to the construction in details the hoe consists of a blade or plate 1 having its central portion cutaway as at 2 and 3, the purpose thereof being to reduce the weight of the metal and also to enable the blade to better work through the ground since the dislodged earth will pass through the opening 2 and 3 and thus reduce the resistance which would otherwise be offered by this material were the blade not so cut away. The greater extent of said openings 2 and 3 being on the blade portion next to the shank. The rounded portion 4 of the blade or plate 1 whose edge 5 is for the greater extent sharpened to provide cutting elements, said cutting edge being slightly rounded for the purpose of enabling the hoe to more easily penetrate the ground. The opposite section or portion 6 of the blade 1 is designed with straight and substantially right angular disposed cutting edges 7 and 8 and an intermediate arch shaped edge 9 which are in like manner sharpened as the edge 5 on the rounded portion 4 and are provided for the purpose of cutting through the ground that may fall through the opening 2 and 3 and partly be thrown against the inside edges 7 and 8 of the blade portion 6 and thus present a minimum amount of resistance to said blade portion. A narrow strip or stay 10 shown in dotted lines is retained as a part of blade 1 if preferred to extend across the central opening for the purpose of enabling a thin light blade to withstand more strain when in actual use. The side portions or corners 11 and 12 of the blade 1 are rounded for removing weeds grown close to the plants without the danger as with hoes having sharp corners of cutting off or injuring the plants. The shank 13 and socket 14 are of ordinary design and construction.

Having thus described the invention what I claim is new and desire to protect by Letters Patent is—

1. A hoe comprising a blade having a slightly rounded cutting edge, the body portion of said blade being centrally cut away and having relatively angularly disposed straight edges and an intermediate arch shaped edge forming the upper margin of said aperture adjacent the shank substantially as described.

2. A hoe comprising a blade having a slightly rounded lower cutting edge, the corners at each side of said edge being rounded, the body portion of said blade being centrally cut away leaving the greater extent of the central cut away portion next to the shank, and angularly disposed
5 straight cutting edges forming the upper margin of said cut away portion adjacent the shank substantially as described.

In testimony whereof I affix my signature in presence of two witnesses.

BERENT O. DAHL.

Witnesses:
J. HENRY BENNETT,
A. HEINZ.